[United States Patent Office — 3,005,816 — Patented Oct. 24, 1961]

3,005,816
NOVEL 18-NOR DERIVATIVES OF CORTISONE

Gaston Amiard, Noisy-le-Sec, and René Heymes, Romainville, France, assignors to Les Laboratoires Francais de Chimiotherapie, Paris, France, a corporation of France
No Drawing. Filed Dec. 16, 1960, Ser. No. 76,156
Claims priority, application France Dec. 24, 1959
4 Claims. (Cl. 260—239.55)

The present invention has as its object novel cortisone derivatives, namely 18-nor-cortisone and its esters, of the structural Formula I:

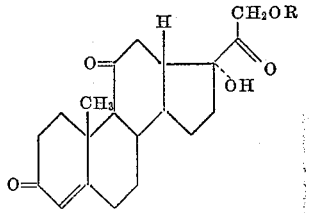

wherein R represents hydrogen or an acyl radical of an organic carboxylic acid having from 1 to 18 carbon atoms as well as the process for their preparation.

The novel compounds possess interesting physiological properties, especially a cortisonic activity and they can be used, in addition, as intermediate products for the synthesis of other steroids.

It is an object of this invention to obtain novel 18-nor-cortisone derivatives having the structural formula:

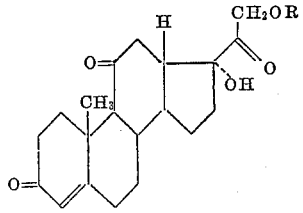

wherein R represents a radical selected from the group consisting of hydrogen and the acyl radical of an organic carboxylic acid having from 1 to 18 carbon atoms.

A further object of this invention is the development of a process for obtaining novel 18-nor-cortisone derivatives having the structural formula:

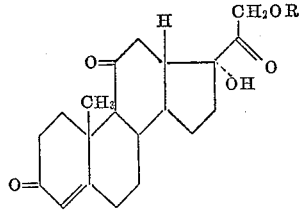

wherein R represents a radical selected from the group consisting of hydrogen and the acyl radical of an organic carboxylic acid having from 1 to 18 carbon atoms.

Another object of this invention is to obtain novel intermediates useful in the synthesis of said 18-nor-cortisone derivatives:

(a) The 3-ethylene ketal of $\Delta^{16}$-18-nor-pregnene-3,11,20-trione, III.
(b) The 3-ethylene ketal of 16,17-epoxy-18-nor-pregnane-3,11,20-trione, IV,
(c) 16 $\xi$ -bromo-18-nor-pregnane-17$\alpha$-ol-3,11,20-trione, V,
(d) 18-nor-pregnane-17$\alpha$-ol-3,11,20-trione, VI,
(e) 4$\xi$-bromo-18-nor-pregnane-17$\alpha$-ol-3,11,20-trione and its 2$\xi$-bromo-isomer, VII and VIIa,
(f) $\Delta^4$-18-nor-pregnene-17$\alpha$-ol-3,11,20-trione and its $\Delta^1$-isomer, VIII and VIIIa,
(g) 21-iodo-$\Delta^4$-18-nor-pregnene-17$\alpha$-ol-3,11,20-trione, IX.

These and other objects of the invention will become more apparent as the description thereof proceeds.

The process for the preparation of 18-nor-cortisone and its esters, according to the invention, consists in a replacement of a hydrogen on the 21-carbon of a previously prepared intermediate, $\Delta^4$-18-nor-pregnene-17$\alpha$-ol-3,11,20-trione, by a hydroxyl group. The hydroxylation can be achieved by either biological or chemical means.

The $C_{21}$ hydroxylation by biological means can be effected by the action of diastases secreted by *Colletotrichum lindemuthianum* (ATCC 12 611) as is described in the U.S. Patent No. 2,805,978.

The $C_{21}$ hydroxylation by chemical means can be effected by the introduction of iodine on the 21-carbon (Ringold and Stork, J. Amer. Chem. Soc., 1958, 80, 250) and acyloxylation of the 21-iodo derivative obtained thereby, in which case the corresponding esters of 18-nor-cortisone are obtained directly. These directly obtained esters can be saponified to the free alcohol.

According to the invention, $\Delta^4$-18-nor-pregnene-17$\alpha$-ol-3,11,20-trione is prepared following the reaction scheme shown in Table I. This process consists essentially of subjecting $\Delta^{16}$-18-nor-pregnene-3,11,20-trione, II, whose ketone in the 3-position is protected by the previous formation of an ketal, to an epoxidation. The 3-ethylene ketal of 16,17-epoxy-18-nor-pregnane-3,11,20-trione is reacted with hydrobromic acid to open the epoxy ring. The 16$\xi$-bromo-18-nor-pregnane-17$\alpha$-ol-3,11,20-trione, V, resulting therefrom is reduced by catalytic hydrogenation into 18-nor-pregnane-17$\alpha$-ol-3,11,20-trione, VI. This last compound is subjected to bromination, which furnishes a mixture of the 4$\xi$-bromo-18-nor-pregnane-17$\alpha$-ol-3,11, 20-trione and 2$\xi$-bromo-18-nor-pregnane-17$\alpha$-ol-3,11,20-trione (compounds VII and VIIa). The brominated isomers are dehydrobrominated and the $\Delta^4$-18-nor-pregnene-17$\alpha$-ol-3,11,20-trione, VIII, is separated from its $\Delta^1$-isomer, VIIIa.

TABLE I

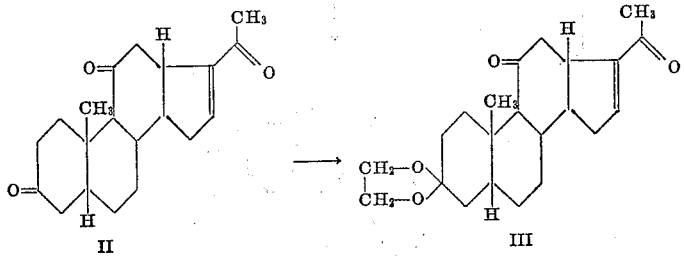

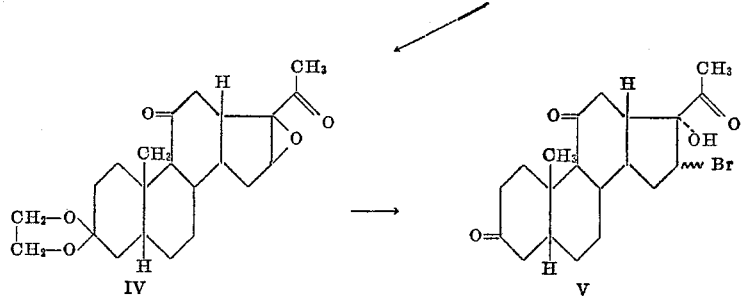
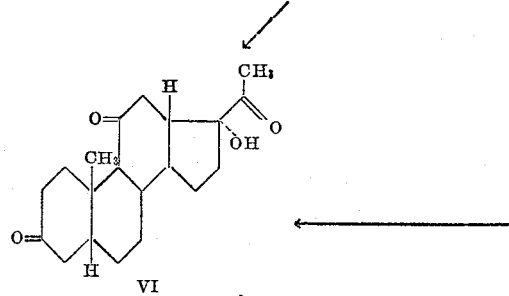
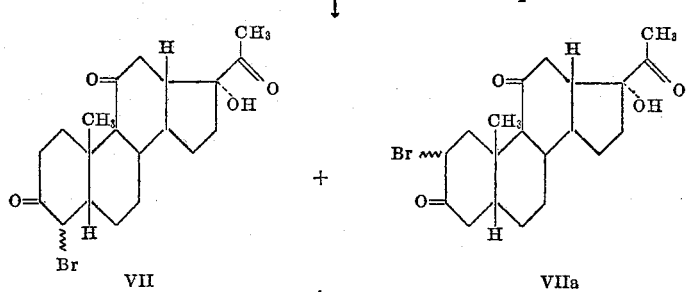
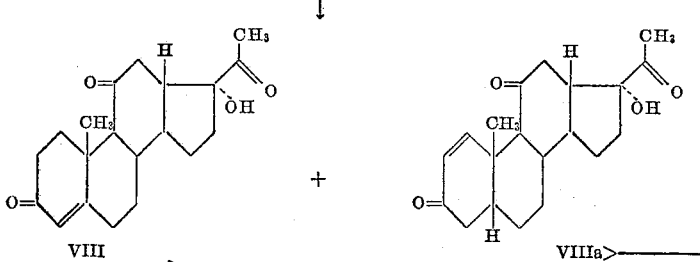
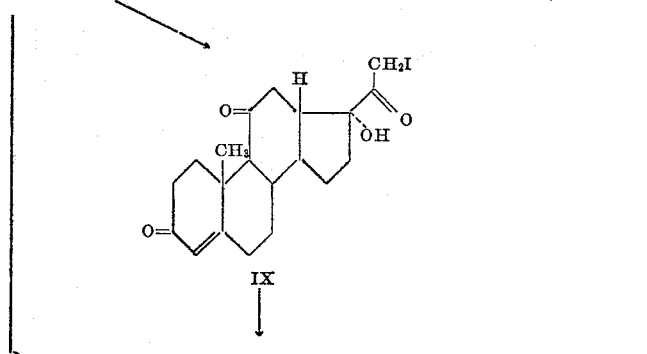
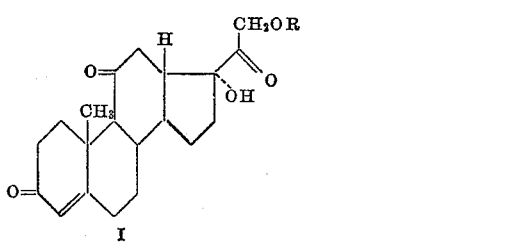
R=H or acyl radical of an organic carboxylic acid having 1 to 18 carbon atoms.

Following another important characteristic of the invention, the byproduct $\Delta^1$-18-nor-pregnene-17α-ol-3,11,20-trione, VIIIa, is transformed by catalytic hydrogenation into 18-nor-pregnane-17α-ol-3,11,20-trione, VI. Thus, the byproduct of the bromination of 18-nor-pregnane-17α-ol-3,11,20-trione is recovered, allowing high yields in all stages of the process of the invention.

The starting compound, $\Delta^{16}$-18-nor-pregnene-3,11,20-trione, is prepared according to the process described in the simultaneously filed, commonly-assigned U.S. patent application Serial No. 76,155, filed December 16, 1960, and entitled "Novel 18-nor-pregnanic derivative and process for its preparation." By this process, 3α-acetoxy-18-nor-D-homo-etiocholane-11,17-dione is reacted with a methyl Grignard compound, saponified and oxidized to give 17-methyl-18-nor-D-homo-etiocholane-17-ol-1,3,11-dione. This latter compound is reacted with hydrochloric acid and dehydrochlorinated to give a mixture of the 17-methyl-18-nor-D-homo-$\Delta^{16}$-etiocholene-3,11-dione and its $\Delta^{17}$-isomer. The $\Delta^{16}$-isomer is separated, oxidized by ozone and the ozonide reduced. The resulting 2α-acetonyl-4,7-dione-1β-formylmethyl-4bβ-methyl-8aβ-perhydrophenanthrene is cyclized to give $\Delta^{16}$-18-nor-pregnene-3,11,20-trione.

Within the scope of the general recitation of the process of the invention, the various synthesis steps are advantageously carried out according to the following stages:

(a) The 3-ethylene ketal of the starting $\Delta^{16}$-18-nor-pregnene-3,11,20-trione, III, is prepared preferably by reacting with ethylene glycol in the presence of a strong acid catalyst such as p-toluene sulfonic acid in an inert organic solvent at elevated temperature.

(b) The 3-ethylene ketal of 16,17-epoxy-18-nor-pregnane-3,11,20-trione, IV, is prepared by reaction of compound III with hydrogen peroxide in an alkaline solution, preferably a lower alkanol containing an alkali metal hydroxide such as a methanolic sodium hydroxide solution at temperatures between about room temperature and about 50° C.

(c) The 16ξ-bromo-18-nor-pregnane-17α-ol-3,11,20-trione, V, is prepared by reaction of compound IV with a concentrated hydrobromic acid solution at temperatures from about −10° C. to about +10° C.

(d) The 18-nor-pregnane-17α-ol-3,11,20-trione VI, is prepared by catalytic hydrogenation of compound V suspended in a lower alkanol, preferably using a palladized charcoal catalyst.

(e) The mixture of 4ξ-bromo-18-nor-pregnane-17α-ol-3,11,20-trione, VII, and its 2ξ-bromo isomer, VIIa, is prepared by reacting compound VI, dissolved in an alkanol, preferably a tertiary lower alkanol such as tert.-butanol, with bromine under acidic conditions at slightly elevated temperatures up to about 50° C.

(f) The $\Delta^4$-18-nor-pregnene-17α-ol-3,11,20-trione, VIII, is prepared by dehydrobrominating the mixture of isomers, VII and VIIa, by heating at temperatures above 100° C. in the presence of an inert organic solvent, such as dimethyl-formamide, and a mixed lithium bromide-lithium carbonate. The $\Delta^4$-isomer, VIII, is separated from its $\Delta^1$-isomer, VIIIa, by crystallization from an organic solvent in which it is less soluble, such as ether.

(g) The $\Delta^4$-18-nor-pregnene-17α-ol-3,11,20-trione, VIII, is hydroxylated in the 21-position by biological means by introducing compound VIII into about a 5-day old active culture of *Colletotrichum lindemuthianum* (ATCC 12 611) and incubating for about 24 hours. The 18-nor-cortisone is recovered by conventional methods.

(h) The $\Delta^4$-18-nor-pregnene-17α-ol-3,11,20-trione, VIII, is hydroxylated in the 21-position by chemical means by reacting compound VIII in an anhydrous inert organic solvent such as tetrahydrofurane with iodine in the presence of calcium chloride and calcium oxide at a temperature of about −15° C to 0° C. The 21-iodo-$\Delta^4$-18-nor-pregnene-17α-ol-3,11,20-trione, IX, is reacted with an alkali metal salt of an organic carboxylic acid having from 1 to 18 carbon atoms, such as potassium acetate in the presence of a small amount of the same acid at reflux temperatures and the corresponding 18-nor-cortisone ester is recovered.

In addition to the 18-nor-cortisone acetate, other esters of 18-nor-cortisone with organic carboxylic acids having from 1 to 18 carbon atoms such as the alkanoates and alkenoates, for example, the acetate, the trimethylacetate, the propionate, the 4,4-dimethyl-pentanoate, the 10-undecenoate; the cycloalkyl-alkanoates, for example, the β-cyclopentyl-propionate; the arylalkanoates, for example, the phenyl-propionate; the cycloalkanoates, for example, the hexahydrobenzoate, the hexahydroterephthalate and other phenyl-carboxylic acids, 3,5-dinitrobenzoate, may also be prepared without departing from the scope of the invention. Such other esters are prepared by reacting the corresponding alkali metal salts of the acids with the 21-iodo derivative in the case of hydroxylation by chemical means or the corresponding esterifying acid derivatives, such as the acid, acid chloride or acid anhydride, with 18-nor-cortisone in the case of hydroxylation by biological means.

The following examples, which are given purely for illustration, are non-limitative in character and will make the invention better understood to one skilled in the art. The temperatures are given in degrees centigrade.

*Example I.—Preparation of $\Delta^4$-18-nor-pregnene-17α-ol-3,11,20-trione, VIII*

(a) THE 3-ETHYLENE KETAL OF $\Delta^{16}$-18-NOR-PREGNENE-3,11,20-TRIONE, III 21.1 gm. of $\Delta^{16}$-18-nor-pregnene-3,11,20-trione, II, obtained according to the process described in U.S. patent application Serial No. 76,155, of the same date, entitled "Novel 18-nor-pregnanic derivative and process for its preparation," were dissolved in 1 liter of chloroform. 100 cc. of ethylene glycol were added thereto and about 50 cc. of solvent were distilled off under atmospheric pressure. Next, 2 gm. of p-toluene sulfonic acid were introduced and the distillation was continued for five minutes. After the addition of 6 gm. of sodium bicarbonate, the mixture was cooled to room temperature, washed with water and the wash water was reextracted with chloroform. The extracts were combined, dried and concentrated in vacuo until the 3-ethylene ketal of $\Delta^{16}$-18-nor-pregnene-3,11,20-trione, III, crystallized. The concentrated solution was iced, vacuum filtered, and the filter cake was washed and dried. 19.2 gm. (that is 80% of theory) of the product, III, was recovered, having a melting point of 200° C. and a specific rotation $[\alpha]_D^{20} = +77°$ (c.=1% in chloroform). Product III was very soluble in chloroform, soluble in acetone, very slightly soluble in alcohol and ether and insoluble in water and dilute aqueous acids or alkalis.

*Analysis.*—$C_{22}H_{30}O_4$; molecular weight=358.46. Calculated: C, 73.71%; H, 8.44%; O, 17.85%. Found: C, 73.5%; H, 8.5%; O, 18%.

Ultraviolet spectrum λ max.= 235 mμ, ε=9 100.

(b) THE 3-ETHYLENE KETAL OF 16,17-EPOXY-18-NOR-PREGNANE-3,11,20-TRIONE, IV

By heating, 10.2 gm. of compound III were dissolved in 204 cc. of methanol containing 1 cc. of concentrated sodium hydroxide solution; then, over a period of one-half hour, 16 cc. of concentrated sodium hydroxide solution and 34 cc. of hydrogen peroxide were introduced into the solution maintained at 42° C. The reaction mixture was agitated at 42° C. for five minutes more, after the end of the hydrogen peroxide introduction, then it was cooled and caused to precipitate by the addition of water and acetic acid. The 3-ethylene ketal of 16,17-epoxy-18-nor-pregnane-3,11,20-trione, IV, was vacuum filtered, the filter cake was washed with water and dried. 9.7 gm. (that is 90% of theory) of product IV was recovered having a melting point of 165° C., which was directly usable for the following stage of the synthesis.

For analysis, the epoxide, IV, was recrystallized from methanol and had a melting point of 169 to 170° C. and a specific rotation $[\alpha]_D^{20} = +105°$ (c.=1% in chloroform). The product was very soluble in chloroform and soluble in acetone, it was slightly soluble in alcohol and ether and in soluble in water and dilute aqueous acids or alkalis.

*Analysis.*—$C_{22}H_{30}O_5$; molecular weight=374.46. Calculated: C, 70.56%; H, 8.08%; O, 21.36%. Found: C, 70.5%; H, 8.0%; O, 21.7%.

(c) 16 ξ-BROMO-18-NOR-PREGNANE-17α-OL-3,11,20-TRIONE, V 17.75 gm. of epoxide, IV, was introduced in 177 cc. of an 8 N hydrobromic acid solution cooled to −10° C., and rapidly dissolved under agitation. The temperature was allowed to rise to +10° C. over the period of one-half hour, then 200 cc. of water were added thereto. The brominated derivative, 16ξ-bromo-18-nor-pregnane-17α-ol-3,11,20-trione, V, precipitated. The suspension was agitated for several minutes and extracted with methylene chloride. After combining and washing the extracts with a solution of sodium bicarbonate, they were dried and concentrated. On the addition of ether, product V crystallized out. 18.3 gm. (that is 93% of theory) of product V was recovered, having a melting point of 190 to 192° C. and a specific rotation $[\alpha]_D^{20} = +36°$ (c.=1% in chloroform). It was very soluble in chloroform, soluble in alcohol, less soluble in acetone and insoluble in ether and water.

*Analysis.*—$C_{20}H_{27}O_4Br$; molecular weight=411.34. Calculated: C, 58.39%; H, 6.61%; O, 15.56%; Br, 19.42%. Found: C, 58.5%; H, 6.5%; O, 15.4%; Br, 19.3%.

(d) 18-NOR-PREGNANE-17α-OL-3,11,20-TRIONE, VI (1) *Preparation of the catalyst.*—In an atmosphere of hydrogen a mixture of 4.5 gm. of animal charcoal, 350 cc. of water and 45 cc. of a 2% solution of palladium chloride was agitated. The mixture was vacuum filtered and the filter cake was washed with water and with alcohol.

(2) *Hydrogenation.*—The palladized charcoal, prepared above, was added to the suspension of 9.12 gm. of the brominated derivative V in 360 cc. of alcohol. 4.5 gm. of sodium acetate was added thereto and the mixture was subjected to the action of hydrogen for an hour and a half until the absorption of about 500 cc. of hydrogen took place. Next, the suspension was vacuum filtered, and the filtrate was concentrated to dryness in vacuo. Ether and 1.8 cc. of concentrated hydrochloric acid were added to the residue, which was then refluxed for 2 minutes. 18-nor-pregnane-17α-ol-3,11,20-trione, VI, crystallized out, water was added to the suspension, ether was driven off in vacuo and the suspension was vacuum filtered. After drying, 6.45 gm. (that is 87.5% of theory) of the product VI were obtained, melting at 138 to 140° C. For analysis, compound VI was recrystallized from a mixture of methylene chloride and ether and a sample melting at 142 to 144° C. was obtained, having a specific rotation $[\alpha]_D^{20} = -10°$ (c.=1% in chloroform). Compound VI was very soluble in chloroform, soluble in alcohol and acetone, very slightly soluble in ether and insoluble in water and dilute aqueous acids or alkalis.

*Analysis.*—$C_{20}H_{28}O_4$; molecular weight=332.42. Calculated: C, 72.26%; H, 8.49%; O, 19.25%. Found: C, 72.4%; H, 8.4%; O, 19.5%.

As a means of identifying compound VI, it was reduced by potassium borohydride to give 18-nor-pregnane-3α,11β,17α,20β-tetra-ol, then the latter was degraded with lead tetraacetate, to furnish 18-nor-etiocholane-3α,11β-diol-17-one, having a melting point of 216° C.

(e) 4ξ-BROMO-18-NOR-PREGNANE-17α-OL-3,11,20-TRIONE, VII

While under agitation and in an atmosphere of nitrogen, 6 gm. of compound VI were dissolved in 60 cc. of tert.-butanol at a temperature of 40° C. 0.2 cc. of 40% aqueous hydrobromic acid was added thereto and then 19.8 cc. of a 2 N solution of bromine in tert.-butanol was introduced dropwise. The solution was cooled, a solution of 3.6 gm. of sodium acetate in 18 cc. of water was added thereto, then the mixture was poured into a mixture of water and ice. The mixture was vacuum filtered. The product obtained thereby was washed with water and then redissolved in 30 cc. of methylene chloride. The solution was washed again with water, dried, concentrated, then caused to precipitate by the addition of ether. 5.4 gm. of the brominated product, melting at about 200° C., was recovered by vacuum filtering. It consisted of a mixture of 2ξ-bromo-18-nor-pregnane-17α-ol-3,11,20-trione, VIIa, and 4ξ-bromo-18-nor-pregnane-17α-ol-3,11,20-trione, VII, containing 20.3% bromine, the theoretical being 19.43%.

(f) Δ⁴-18-NOR-PREGNENE-17α-OL-3,11,20-TRIONE, VIII 5 gm. of the brominated product obtained according to (e) above were introduced into a mixture of 50 cc. of dimethylformamide, 2.5 gm. of lithium bromide and 1.25 gm. of lithium carbonate and heated to 138° C. for 30 minutes. After cooling, water was added and the mixture was extracted with methylene chloride. The extracts were combined, washed with water, dried, treated with animal charcoal, filtered and concentrated to a syrupy consistency. The residue was redissolved in ether and, after several minutes, Δ⁴-18-nor-pregnene-17α-ol-3,11,20-trione, VIII, crystallized out. It was vacuum filtered, the filter cake was washed with ether and 2.06 gm. (that is 50% of theory) of the product VIII having a melting point of 188 to 190° C. and a specific rotation $[\alpha]_D^{20} = +137°$ (c.=1% in chloroform) was obtained. Compound VIII was very soluble in chloroform, slightly soluble in alcohol and ether, insoluble in water and dilute aqueous acids or alkalis.

*Analysis.*—$C_{20}H_{26}O_4$; molecular weight=330.41. Calculated: C, 72.70%; H, 7.93%. Found: C, 72.7%; H, 7.8%.

Ultraviolet spectrum λ max. 239 mμ, ε=15 100.

By concentration of the mother liquor, a residue was obtained which was crystallized from ether and furnished 0.88 gm. of Δ¹-18-nor-pregnene-17α-ol-3,11,20-trione, VIIIa, having a melting point of 140° C. and a specific rotation $[\alpha]_D^{20} = +83°$ C. (c.=1% in chloroform). Ultraviolet spectrum λ max. 277 mμ, ε=9 600.

Hydrogenation of compound VIIIa, following the mode of operation described above, allowed the recovery of 0.52 gm. of 18-nor-pregnane-17α-ol-3,11,20-trione, VI.

*Example II.*—*Preparation by biological means of 18-nor-cortisone*

*Colletotrichum lindemuthianum* (ATCC 12 611) was cultivated for 10 days at 24° C. on an agar medium with a base of 2% saccharose and 20% decoction of potatoes. The conidium was collected in distilled water. The suspension obtained thereby served to inoculate under sterile conditions 1 liter Erlenmeyer flasks containing 100 cc. of a medium composed as follows:

| | Gm. |
|---|---|
| Pure glucose | 10 |
| Malt extract | 5 |
| Soy bean meal | 10 |
| Sodium chloride | 5 |
| Dry corn steep | 5 |
| Calcium carbonate | 1 |

Tap water q.s. ad. 1,000 cc.

The pH of this medium had been previously adjusted to 6.8 to 7 by potassium hydroxide and it had been sterilized by heating for 30 minutes at a temperature of 120° C.

After 5 days of culturing at 24° C. on a shaking device (85 oscillations per minute, 8 cm. length), 10 cc. of a 1% acetone solution of $\Delta^4$-18-nor-pregnene-17$\alpha$-ol-3,11,20-trione, VIII, obtained according to the preceding example, were added to 1,000 cc. of the culture. Another incubation of 24 hours led to 18-nor-cortisone as was evidenced by chromatographic determination on paper. 50 cc. of culture broth was filtered and the mycelium was washed twice with 5 cc. aliquots of acetone which were added to the filtrate. The mycelium was then extracted twice with 50 cc. aliquots of chloroform and the preceding filtrate was extracted with these 100 cc. of chloroform, then twice again, each time with a 20 cc. aliquot of chloroform. The combined chloroform extracts were washed first with an aqueous solution of sodium bicarbonate, then with water, dried over magnesium sulfate and evaporated to dryness in vacuo. The residue was taken up in 1 cc. of methanol and the solution used for chromatography on paper. Before the chromatography, the paper was immersed in a 30% solution of propylene glycol. After allowing to drip, chromatography was effected by using toluene saturated with propylene glycol for the steroid with a development of eight to fifteen hours. The appearance of spots was brought about by the colored reaction of Mader et al. (Anal. Chem., 1952, 24, 666) with triphenyl-tetrazolium chloride which gave a red coloration on a white base with steroids possessing the ketol function R—CO—CH$_2$OH.

*Example III.—Preparation of 18-nor-cortisone (acetate) by chemical means*

(a) IODIZATION 720 mgm. of $\Delta^4$-18-nor-pregnene-17$\alpha$-ol-3,11,20-trione, VIII, obtained according to Example I, was dissolved in the hot, in 4 cc. of anhydrous tetrahydrofuran, cooled to room temperature and 6 cc. of methanol containing 10% of calcium chloride was added thereto. The solution was then cooled to —15° C. (exterior temperature), 1.44 gm. of quicklime was introduced therein, then 624 mgm. of iodine. The reaction mixture was agitated in a closed vessel for about one-half hour until decoloration occurred. The mixture was vacuum filtered and a solution of 21-iodo-$\Delta^4$-18-nor-pregnene-17$\alpha$-ol-3,11,20-trione (compound IX) was obtained, which was directly usable for the following stage of the synthesis.

(b) ACETOXYLATION 2.9 gm. of fused potassium acetate was covered with 18 cc. of acetone, 20 drops of acetone containing 10% acetic acid was added thereto, then, under an atmosphere of nitrogen, the tetrahydrofuran solution of the iodized compound IX was added. The reaction mixture turned brown, it became a solid mass, then, after several minutes of heating, the suspension progressively decolored. The suspension was heated to reflux for one hour and a half. Water was added, then the organic solvents were distilled off, in a slight vacuum, under nitrogen. The mineral products dissolved and 18-nor-cortisone acetate crystallized in hydrated needles. The suspension was iced, vacuum filtered, washed with water and dried at 50° C. 656 mgm. of the raw product were recovered. By redissolution in acetone containing acetic acid, treatment with zinc, then with animal charcoal, the acetate of 18-nor-cortisone was obtained with a yield of 90%. It melted at 212 to 214° C. and had a specific rotation $[\alpha]_D^{20} = +172°$ (c.=1% in chloroform). It was very soluble in chloroform, soluble in acetone, slightly soluble in alcohol and ether, and insoluble in water and dilute aqueous acids or alkalis.

*Analysis.*—$C_{22}H_{28}O_6$; molecular weight=388.44. Calculated: C, 68.02%; H, 7.27%. Found: C, 67.9%; H, 7.2%.

Ultraviolet spectrum $\lambda$ max. 238 m$\mu$, $\epsilon$=15 800.

Starting with aqueous acetone, the acetate of 18-nor-cortisone in the form of the monohydrate was obtained which, on heating to 100° C., easily lost water (loss= 4.4%, theoretical being 4.5%).

It will be understood that the invention is not limited to the specific modes of execution described above. Particularly, it is evident to one skilled in the art that it is possible to use equivalent techniques such as to vary the temperatures, the nature of the solvents or the ester of the organic carboxylic acid having from 1 to 18 carbon atoms, without departing from the spirit of the invention or the scope of the appended claims.

We claim:

1. The 3-ethylene ketal of $\Delta^{16}$-18-nor-pregnene-3,11,20-trione.
2. The 3-ethylene ketal of 16,17-epoxy-18-nor-pregnane-3,11,20-trione.
3. $\Delta^4$-18-nor-pregnene-17$\alpha$-ol-3,11,20-trione.
4. $\Delta^1$-18-nor-pregnene-17$\alpha$-ol-3,11,20-trione.

References Cited in the file of this patent

UNITED STATES PATENTS

| | | |
|---|---|---|
| 2,870,177 | Conbere et al. | Jan. 20, 1959 |
| 2,927,921 | Oliveto et al. | Mar. 8, 1960 |

OTHER REFERENCES

Sarett et al.: J.A.C.S., 74, 4974–76 (1952).